United States Patent [19]

Abileah

[11] Patent Number: 5,479,275
[45] Date of Patent: Dec. 26, 1995

[54] BACKLIT LIQUID CRYSTAL DISPLAY WITH INTEGRAL COLLIMATING, REFRACTING, AND REFLECTING MEANS WHICH REFRACTS AND COLLIMATES LIGHT FROM A FIRST LIGHT SOURCE AND REFLECTS LIGHT FROM A SECOND LIGHT SOURCE

[75] Inventor: Adiel Abileah, Farmington Hills, Mich.

[73] Assignee: OIS Optical Imaging Systems, Inc., Troy, Mich.

[21] Appl. No.: 161,277

[22] Filed: Dec. 3, 1993

[51] Int. Cl.⁶ ............ G02F 1/1335; G01D 11/28; F21V 7/04
[52] U.S. Cl. ............ 359/48; 359/49; 362/26; 362/27; 362/31; 385/901
[58] Field of Search ............ 359/48, 49, 50; 362/26, 27, 31, 32, 326, 336; 385/146, 901

[56] References Cited

U.S. PATENT DOCUMENTS

| | | | |
|---|---|---|---|
| 4,171,874 | 10/1979 | Bigelow et al. | 359/49 |
| 4,456,336 | 6/1984 | Chung et al. | 359/70 |
| 4,580,877 | 4/1986 | Washo | 359/48 |
| 4,616,295 | 10/1986 | Jewell et al. | 362/31 |
| 4,660,936 | 4/1987 | Nosker | 359/40 |
| 4,704,004 | 11/1987 | Nosker | 359/49 |
| 4,723,840 | 2/1988 | Humbert et al. | 359/49 |
| 4,768,096 | 8/1988 | Cannell ae tla. | 358/473 |
| 4,798,448 | 1/1989 | van Raalte | 359/41 |
| 4,874,228 | 10/1989 | Alo et al. | 359/49 |
| 4,915,479 | 4/1990 | Clarke | 359/49 |
| 4,934,793 | 6/1990 | Klein | 359/49 |
| 4,936,659 | 6/1990 | Anderson et al. | 359/54 |
| 4,984,872 | 1/1991 | Vick | 359/15 |
| 5,040,878 | 8/1991 | Erchenlaub | 359/49 |
| 5,046,826 | 9/1991 | Iwamoto et al. | 359/49 |
| 5,050,946 | 9/1991 | Hathaway | 385/33 |
| 5,121,234 | 6/1992 | Kucera | 359/50 |
| 5,128,783 | 7/1992 | Abileah et al. | 359/49 |
| 5,143,433 | 9/1992 | Farrell | 362/29 |
| 5,161,041 | 11/1992 | Abileah et al. | 359/40 |
| 5,211,463 | 5/1993 | Kalmanash | 362/26 |
| 5,262,880 | 11/1993 | Abileah | 359/40 |

FOREIGN PATENT DOCUMENTS

| | | |
|---|---|---|
| 0030875 | 6/1981 | European Pat. Off. . |
| 0615151 | 9/1994 | European Pat. Off. . |
| 54-66862 | 5/1979 | Japan . |
| 63-110422 | 5/1988 | Japan . |
| 4-377718 | 2/1992 | Japan . |
| 4-225324 | 8/1992 | Japan . |
| 2198867 | 6/1988 | United Kingdom . |

OTHER PUBLICATIONS 3M, 3M Scotch™ Optical Lighting Film General Theory (Nov., 1988).
3M, 3M Scotch™ Optical Lighting Film Application Bulletin Thin Light Box, Nov. 1988.
Robbins et al, 8"×8" Full Color Cockput Display Sep. 1990.
IBM Tech. Disclosure Bulletin, Polarized Backlight for Liquid Crystal Display, vol. 33, No. 1B, Jun. 1990.
Abileah et al, A Full Color AMLCD w/NVG Class B Compatibility, 1992.
Abileah et al, Practical Aspects of AMLCD Application.
Abileah et al, Full Color Display w/Amorphous Silicon Pin Diodes for High Performance, (1989).
Abileah et al, Performance of Full Color Active–Matrix LCD in the Cockpit Environment, 1989.
Military Specificjation, Lighting, Aircraft, Interior, Night Vision Imaging System Compaitible (MIL–L–85762) (1986).
"3M/Optical Systems Right Angle Backlighting Technology Design Aid", 1991.

Primary Examiner—James B. Mullins
Assistant Examiner—Walter J. Malinowski
Attorney, Agent, or Firm—Myers, Liniak and Berenato

[57] ABSTRACT

An improved NVG compatible day/night backlighting assembly for a color liquid crystal display includes a daytime high intensity light source, an edge-mounted nighttime low intensity light source, and an integral collimating/reflecting/image splitting lens which collimates and image splits the light emitted from the high intensity daytime light source, and reflects upward the low intensity light rays emanating from the low intensity edge-mounted light source.

12 Claims, 8 Drawing Sheets

BACKLIT LIQUID CRYSTAL DISPLAY WITH INTEGRAL COLLIMATING, REFRACTING, AND REFLECTING MEANS WHICH REFRACTS AND COLLIMATES LIGHT FROM A FIRST LIGHT SOURCE AND REFLECTS LIGHT FROM A SECOND LIGHT SOURCE

This invention is related to commonly owned, copending, U.S. Application Ser. No. 08/031,120, the disclosure of which is hereby incorporated herein by reference.

BACKGROUND OF THE INVENTION

This invention relates to backlit liquid crystal display devices (LCDs) having a first light source for operation during the day, and a second light source for operation at night.

LCDs (i.e. liquid crystal display devices) are gaining in popularity for use in systems such as television receivers, computer monitors, avionic displays, aerospace displays, and other military-related displays where the elimination of cathode ray tube (CRT) technology is desirable for several reasons. In particular, cathode ray tubes are characterized by large depth dimensions, undesirably high weight, and fragility. Additionally, cathode ray tubes (CRTs) require a relatively high voltage power supply in order to sufficiently accelerate electron beams for displaying images.

The aforementioned shortcomings of cathode ray tubes are overcome by flat panel liquid crystal displays in which matrix arrays of liquid crystal picture elements or pixels are arranged in a plurality of rows and columns. Patterns of information are thereby defined by the two dimensional array of pixels, which because of differences in the orientation of the liquid crystal material within each pixel, are caused to appear either darkened or transparent.

Liquid crystal displays may be either transflective or transmissive. Transflective displays depend upon ambient light conditions in order to be viewed, i.e. light from the surrounding environment, wherein ambient light incident upon the side of the display facing the viewer is reflected back to the viewer and allows the display to be viewed by observers. Transflective liquid crystal displays cannot, therefore, be used in dark or low light environments, because there is no light available for reflection back to the viewing surface of the display.

Conversely, transmissive or backlit liquid crystal displays require the use of illuminating means, such as a tubular or serpentine fluorescent lamp array, operatively disposed on the side of the matrix array opposite the viewer. This illumination means, or backlight, may also include a back reflector adapted to efficiently redirect any stray illumination towards the matrix array of pixels, thus insuring that the displayed image is as bright as possible (given the characteristics of the lighting scheme employed).

In the past, a large amount of research in the field of flat panel liquid crystal devices has been dedicated to the design of backlighting schemes which optimize viewing and structural parameters of liquid crystal displays. Particular focus has been on the desirablity of achieving substantial uniformity and high intensity of light across the illuminated matrix area while maintaining low power consumption and a low overall profile, i.e. a thin assembly.

For example, as disclosed in commonly assigned U.S. Pat. No. 5,161,041, the entire disclosure of which is incorporated herein by reference, a lighting assembly for a backlit color LCD includes an integrally formed image splitting/collimating lens for effectively enlarging the area illuminated by any one or part of one of the backlighting lamps. This integral image splitting and collimating lens has the advantages of providing a bright, uniform light to the matrix array of pixels while maintaining a narrow profile and minimizing the power consumption of the display. This bright, uniform lighting scheme achieves a high contrast display in bright ambient light conditions. The effect of the integral image splitting and collimating lens is to eliminate local bright and pale spots in the display corresponding to the legs and spaces between the legs of a typical serpentine fluorescent lamp, by providing two similar images of the light emanating from each lamp leg. By locating the split images substantially contiguous, one to the other, the area of illumination is effectively enlarged and a bright, uniform light distribution across a low profile LCD is obtained. Additionally, when a light diffuser is provided between the integral lens and the matrix array, wide angle viewability is achieved. The precise diffuser chosen depends on the specific application of the liquid crystal display.

In preferred embodiments of U.S. Pat. No. 5,161,041, the integral image splitting and collimating lens includes a thin film having light refracting, faceted prisms formed on one of its faces. An example of such a film is 3M SCOTCH™ Optical Lighting Film, described in "3M Scotch™ Optical Lighting Film General Theory" (November, 1988), the disclosure of which is incorporated herein by reference. In preferred forms, this thin 3M Scotch film is laminated onto a clear transparent substrate of, for example, glass, ceramic or plastic (most preferably glass).

While the liquid crystal displays of U.S. Pat. No. 5,161,041 have a low profile, improved lighting efficiencies, and excellent optical properties, only one light source or lamp is used for both day and nighttime operation. In many cases, particularly military uses, it becomes necessary to be capable of viewing a liquid crystal display both during the day, and during dark conditions when the viewer is utilizing night vision electronic equipment, such as night vision goggles (NVG). Such night vision electronic equipment is designed to be sensitive to very low light level intensities, frequently in the near infrared region. Any near infrared source of light at an intensity above the surrounding nighttime conditions will have the tendency to cause night vision electronic viewing equipment (e.g. NVG) to overload and cease functioning. Quite clearly then, LCDs designed for daylight and nighttime use which employ a single lighting source that emits IR energy becomes a handicap when night vision goggles (NVG) etc. are to be employed.

One solution to the above-described problem is to dim the light source of aforesaid mentioned U.S. Pat. No. 5,161,041 to sufficiently low intensity levels required for nighttime use. The backlit liquid crystal display light source(s) of U.S. Pat. No. 5,161,041, when dimmed to the low intensity levels required for nighttime use, produce excellent low intensity light rays. However, when dimmed to very low intensity levels, many fluorescent lamps tend to lose their stability and uniformity. Loss of stability is defined herein to mean that the fluorescent lamps may begin to flicker. Loss of uniformity is defined herein to mean that dark and light bands or strips appear along the fluorescent lamps.

Night vision equipment operates, as aforesaid, because of high sensitivity to very low levels of light, mainly in the near infrared region of the spectrum (i.e. about 630–1,100 nm). Efforts to block the infrared (IR) emissions of liquid crystal displays and other display panel equipment have largely been unsuccessful because color integrity (particularly of the color red) and the ability to view LCDs at wide viewing angles from normal (e.g. up to about 30°–60° from normal) could not be achieved. This is particularly true when it comes to achieving these results in the highly advantageous active matrix liquid crystal displays.

The problems associated with achieving acceptable IR blockage, while maintaining color integrity and wide viewing angles, are reported and demonstrated in Abileah et al., "A Full Color AML With NVG Class B Compatibility" IEEE, *AES Magazine* (March, 1992), pp. 1237–1241. The entire disclosure of this report is incorporated herein by reference.

A significant solution to this problem is found in my commonly assigned, co-pending U.S. patent application Ser. No. 07/925,193, now U.S. Pat. No. 5,262,880, the disclosure of which is hereby incorporated herein by reference. Here a sharp cut-off IR filter is employed. This filter, while cutting off the infrared region of the spectrum, does not cut off a portion of the visible red light. The resulting display thus can pass the NVIS-B criteria of Military Standard MIL-L-85762A, incorporated herein by reference.

U.S. Pat. No. 5,143,433, illustrated by FIGS. 1–5, discloses a backlit liquid crystal display panel which is readable via the unaided eye under bright lighting conditions of daylight and is also readable with night vision equipment (e.g. NVG) under darkened conditions of night. Fluorescent lighting tubes are used to provide high intensity light sources for daylight naked eye viewing of the display, and secondary low intensity light sources are used to allow for nighttime viewing of the display via night vision equipment.

Prior art FIG. 1 illustrates a preferred embodiment of the liquid crystal display panel backlighting system of U.S. Pat. No. 5,143,433, which utilizes primary high intensity fluorescent light tubes 18 either formed in a continuous serpentine fashion to attempt to achieve light distribution evenly over the liquid crystal display panel 12, or alternatively by using fluorescent light tubes 18 positioned parallel to one another behind the liquid crystal panel 12 of the display. A reflector body 24 is placed behind high intensity fluorescent tubes 18 to reflect light emitted in the reverse direction of the fluorescent tubes back towards the liquid crystal display panel 12 in a manner to encourage or enhance an even distribution of light intensity on the liquid crystal display. As shown in FIGS. 1–2, a reflecting surface 20 of reflector body 24 is sculptured to form cylindrically circular or parabolic reflection behind fluorescent tubes 18 as desired for the particular circumstance.

As shown in FIG. 2, light emitted during daylight operating conditions is shown by rays 30 emanating from the high intensity fluorescent light tubes 18. As shown, it is seen that forward or upward emitted rays proceed directly towards and through liquid crystal display panel 12 while the backside rays are reflected by surface 20 thereby being redirected toward the display panel 12. This illustrates the prior art normal manner of operation for daytime viewing where the liquid crystal display can be read with brightness and contrast. A diffuser plate 16 is placed in the path of the backlighting rays 30 before they reach the liquid crystal display panel 12. The diffuser 16 tends to smooth out the light intensity to aid in obtaining even intensity and wide viewing angles across the entire surface area of the LCD.

The embodiment of U.S. Pat. No. 5,143,433, as shown in prior art FIGS. 1–5, inserts within the reflector block low level light sources. For the particular embodiment shown in FIGS. 1 and 2, these low level light sources (22 and 38) are located along the axis of and behind each fluorescent light tube 18. By this arrangement, as shown in FIG. 2, low level light rays for use at nighttime emitted by light sources 38, represented by rays 32, are intercepted by the fluorescent light tubes 18 and reradiated for the most part as rays 34. This effect serves to provide a diffusing nature to the low intensity light reaching the liquid crystal display panel 12. The net result is a low intensity, diffused light impinging on panel 12. The further use of a diffuser 16 is not deemed necessary, although depending on the circumstances it is capable of being applied as required. The low level light sources 38 may be either incandescent, fluorescent lamps, or light emitting diodes.

FIG. 4 illustrates a second embodiment of U.S. Pat. No. 5,143,433 including a solid state optical plate 41 used as a light waveguide for backlighting the liquid crystal display. Fluorescent high intensity daytime light tubes 43 illuminate the edges of light guide 41. Light waves 45 emanating from fluorescent tubes 43 move through waveguide 41 by reflecting from one surface to the other back and forth across the width of the waveguide. The lower surface 47 of waveguide 41 is roughened slightly to cause a diffused scattering of light rays 45. This results in a diffused spread of light rays 49 upward in the direction of the liquid crystal display. This diffused reflection occurs continuously throughout wave guide 41 along lower surface 47. By this means, the liquid crystal display of this embodiment of U.S. Pat. No. 5,143,433 is illuminated from behind with a field of light across its surface area.

In FIG. 5, light guide 41 is shown configured on two sides by daytime high intensity fluorescent light tubes 43 and augmented on all four sides by distributed arrays 51 of low level intensity nighttime light sources. During daylight viewing, fluorescent light tubes 43 emit high intensity light rays through waveguide 41 to allow bright viewing of the LCD. For nighttime viewing through night vision equipment, high intensity fluorescent tubes 43 are turned off and low intensity light sources located in arrays 51 are activated. The installation of the low level light sources in arrays 51 is augmented with small night vision filters such as filters 53 shown in FIG. 3. As shown in FIG. 5, each array 51 houses a plurality of low intensity light sources and corresponding infrared filters such as those illustrated in FIG. 3.

Due to the structural arrangement of the backlighting system of U.S. Pat. No. 5,143,433, a large number of low intensity light sources and corresponding IR filters are needed. It would be advantageous to reduce the number of low intensity light sources and corresponding IR filters needed to properly illuminate a liquid crystal display during darkened conditions when NVG compatibility is required.

The liquid crystal display of U.S. Pat. No. 5,143,433 illustrated in FIGS. 1 and 2, also has an increased thickness or profile due to the positioning of nighttime low intensity light sources 38 and corresponding infrared filters 36 below the high intensity light tubes 18. In certain circumstances, such as cockpit liquid crystal display mounting, this added thickness is a disadvantage due to the spacial restrictions for instrument mounting.

The liquid crystal display of U.S. Pat. No. 5,143,433, as illustrated in FIGS. 4 and 5, has increased length and width dimensions due to the positioning of low level light sources 51 exterior to primary high intensity light sources 43. The low intensity nighttime light sources of FIGS. 4 and 5 cannot be edge-mounted except for the provision of light guide 41. Furthermore, due to the location of waveguide 41, the high intensity light sources 43 must also be edge-mounted adjacent the waveguide 41. Although providing an adequate day and night viewable liquid crystal display, the display of U.S. Pat. No. 5,143,433 takes up valuable space due to its large dimensions resulting from the addition and positions of the low intensity light sources. Furthermore, the LCD of FIGS. 1–5 utilizes a high number and redundancy of low intensity lamps, and a relatively high amount of total power is consumed by its lighting scheme.

Furthermore, the diffusers illustrated in FIGS. 15, while useful for improving the uniformity of projected light, deleteriously affect the intensity of the projected light resulting in the light appearing soft or washed out. Thus, additional high intensity lamps are required due to the employment of the light diffusers, resulting in an increased heating effect and power consumption upon the display.

For these and for other reasons there exists a need in the art for a liquid crystal display viewable both at night by night vision equipment (e.g. NVG) and during the daytime via the naked eye, which consumes a minimal amount of power, has a low profile, uses a minimal number of lamps, and a minimal number of infrared filters.

Furthermore, LCD backlighting systems with night lamps of lowered intensities are useful in commercial avionic application where low intensity dimming at night is advantageous for night convenience, absent NVG.

The term "low profile" is used herein in accordance with its well-known meaning in the art. Generally speaking, this term refers to a liquid crystal display which, through its thinness, does not take up inordinate space, often a critical characteristic or requirement to be met in avionics and aerospace vehicles. The term "low profile" may be defined by the term "LCD thickness" and/or "LCD size". "LCD thickness" is herein defined as overall display thickness including the matrix array, optics, backlight, ballast, and circuitry (e.g. when the elements of FIGS. 1, 6, and 11 are assembled together in an outside box, not shown). To be a "low profile" LCD, the LCD thickness should be less than about two inches, while the backlighting assembly thickness (e.g. elements 61, 63, 65, 72, 74, and 78 of FIG. 11) is preferably about 1.5 inches or less. The term "LCD size" is herein defined by the term "LCD thickness" plus the length and width dimensions of the overall LCD assembly.

The terms "substantially all infrared light" and "substantially all red light" are used herein together to mean that the infrared filter employed is one which creates a reasonably sharp cutoff between the near IR and red spectrum. An example of a filter with an unacceptable cutoff is reported in Abileah et al., "A Full Color AMLCD With NVG Class B Compatibility" IEEE *AES Magazine* (March, 1992), pp. 1237–1241, in FIG. 2, p. 1238. The result, as shown in FIG. 1, curve (2) of that article, is an unbalanced white color and a shift of the red color toward orange. An example of a filter with an acceptable, reasonably sharp cutoff is shown in FIG. 3, p. 1239 of that article. Such a filter, which only achieves a truly sharp cutoff for incident light at angles normal to its surface, may be obtained from WAMCO Corp (California, U.S.A.) as a "Wamco Night Vision Filter" and has the Spectral Table given in the aforesaid mentioned U.S. patent application Ser. No. 07/925,193, now U.S. Pat. No. 5,262,880.

It is a purpose of this invention to fulfill the above described needs, as well as other needs apparent to the skilled artisan from the following detailed description of this invention.

SUMMARY OF THE INVENTION

Generally speaking, this invention fulfills the above-described needs in the art by providing a backlighting system for a liquid crystal display, comprising: a first light source for emitting high intensity light; a second light source for emitting low intensity light; an integral collimating, reflecting, and image splitting means for: i) collimating light from said first light source; ii) refracting light from said first light source to provide two similar images thereof; and iii) reflecting light rays from the second light source and redirecting the rays from the second light source toward the liquid crystal display; and wherein the first light source is located on a first side of the integral collimating, reflecting, and image splitting means which is opposite a viewer, and the second light source directs its light rays toward the integral collimating, reflecting, and image splitting means from a second side of the integral means opposite the first side.

In certain preferred embodiments of this invention, the integral means includes a thin film layer having a plurality of facets and prisms formed thereon defining an outer surface thereof, and wherein the faceted prisms reflect the light rays of the second light source, and columinate and refract light rays of the first light source, whereby the light rays of both the first and second light sources are directed toward a matrix array of liquid crystal display pixel.

This invention further fulfills the above described needs in the art by providing in a backlit liquid crystal display which includes: a first light source for emitting high intensity light activated for daylight viewing of the display; a second light source for emitting low intensity light for viewing in darkened conditions when the first light source is deactivated; and means for diffusing the high and low intensity light wherein the diffusing means is operatively disposed between a matrix array of liquid crystal picture elements and the first and second light sources; the liquid crystal display being capable of providing an image to a remotely positioned observer, the improvement comprising:

an integral collimating, reflecting, and image splitting means, fixedly mounted between the diffusing means and the first light source, for: (i) collimating light from the first light source; (ii) refracting light rays emanating from the first light source for emitting high intensity light to provide two similar images thereof; and (iii) reflecting light rays emanating from the second light source and redirecting the rays upward and through the diffusing means and into the matrix array of liquid crystal elements; thereby enlarging the area effectively illuminated by the first and second light sources, whereby a uniform daytime and nighttime light distribution is provided in a low profile assembly.

In certain preferred embodiments of this invention the second light source for emitting low intensity light includes an elongated tubular lamp which is edge-mounted between the diffusing means and the integral collimating, reflecting, and image splitting means; and there is provided an infrared light-absorbing filter capable of preventing substantially all infrared light from being emitted from the second light source while, at the same time, transmitting substantially all red light therethrough thereby to maintain the color integrity of the display. This filter is preferably fixedly mounted between the second light source and the integral collimating, reflecting, and image splitting means.

In further preferred embodiments of this invention, the infrared filter maintains the color integrity of the image of the display throughout a viewing angle of from about 0°–60° from normal, and the display includes, in order from back to front: a reflector plate; the first light source; the integral collimating, reflecting, and image splitting means; the edge-mounted second light source; corresponding infrared filter; the diffusing means; and the matrix array.

In other preferred embodiments of this invention, the liquid crystal display has a RGB-triad color pattern, and the integral collimating, reflecting and image splitting means includes a thin film layer having faceted prisms formed on an upper face thereof, wherein light rays from the first light source are refracted by the faceted prisms to provide two similar images thereof, and light rays from the second light source are reflected by the faceted prisms toward the matrix array.

In certain further embodiments of this invention, the high intensity light of the first light source is directed upward from the first light source through inner and outer surfaces of the integral collimating, reflecting, and image splitting means and thereafter through the diffusing means; and wherein the low intensity light of the second light source is directed toward and reflected by the outer surface of the integral collimating, reflecting, and image splitting means toward and thereafter through the diffusing means. In certain other preferred embodiments of this invention the integral collimating, reflecting and image splitting means includes a thin film layer having faceted prisms formed thereon defining the outer surface, and wherein the faceted prisms reflect light rays of the second light source, and collimate and refract light rays of the first light source, whereby the light rays of both the first and second source means are directed upward toward said matrix array.

The term "low profile" has been defined above. A typical "low profile" LCD encompassed by this invention is one with the following display parameters:

Screen size: 5.0" dia.

LCD thickness: about 1"

Viewing area: 3" (V)×4" (H) (77×102 mm)

Pixel No.: 648(H)×240 (V)

Color groups: 432(H)×120 (V)

Resolution: 108(H)×80 (V) color groups/in.

Color pattern: RGB-triad

Active device: TFT

Polarizers Crossed (normally white)

In the table above, the LCD thickness includes about 4,000 fL. of backlight diffused illumination after the NVG infrared filter and diffuser. The quality of white balance maintained by such a system at all reasonable viewing angles (about 0°–60° from normal to the screen) is good and is exemplified in FIG. 5 of the aforesaid article by Abileah et al., as cited above and as incorporated herein by reference.

In summary of the above, the subject invention in certain particularlity preferred embodiments provides a full color AMLCD (active matrix liquid crystal display) having: NVIS-B NVG Compatibility; both a daytime and nighttime light source; a reduced number of nighttime light sources and corresponding IR filters; low power consumption; a thin profile; and improved red color coordinates. Such full color AMLCDs find wide and varied usages throughout avionics and the military.

This invention will now be described with reference to certain embodiments thereof as illustrated in the following drawings.

IN THE DRAWINGS

Figure 1:
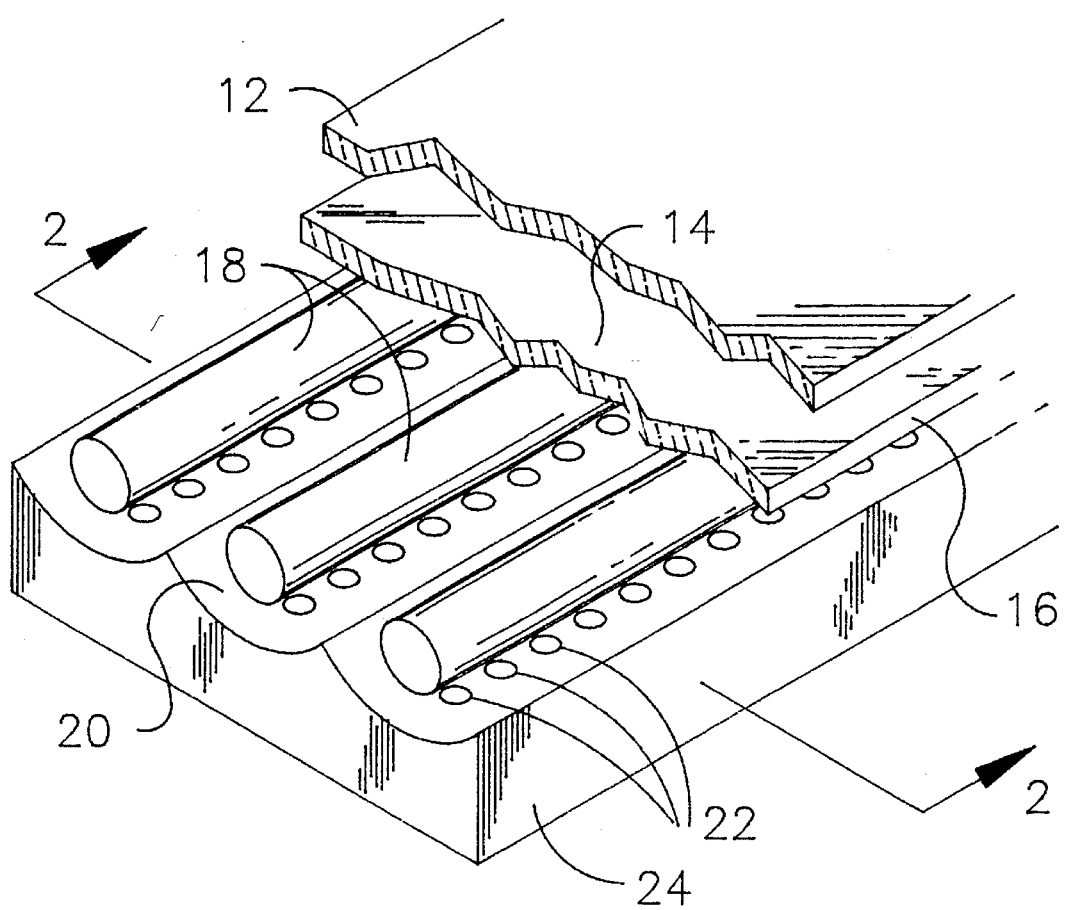
FIG. 1 is a cut-away view of the construction of a prior art backlit liquid crystal display using primary fluorescent light tubes backed by holes for housing secondary low level miniature low intensity light sources.
Figure 2:
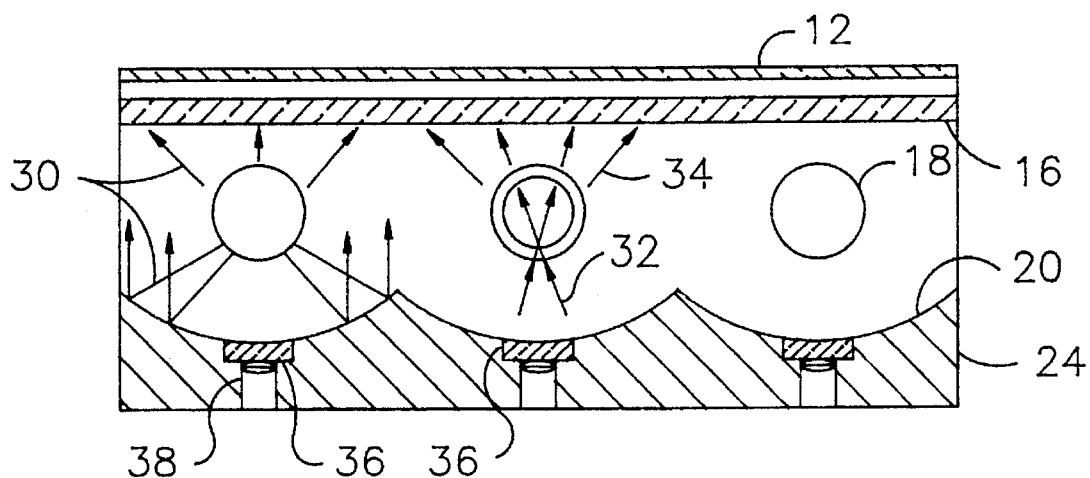
FIG. 2 is a cross-sectional view of FIG. 1 showing detailed installation of the low intensity light sources beneath the primary fluorescent high intensity light tubes.
Figure 3:
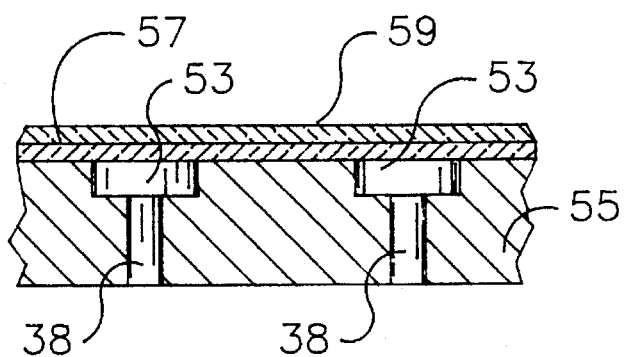
FIG. 3 is a prior art cross sectional view of a liquid crystal display employing low level light sources.
Figure 4:
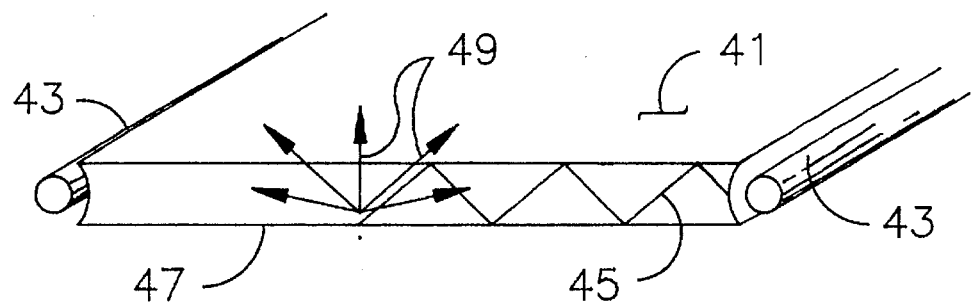
FIG. 4 is a prior art cross-sectional view of a prior art solid state light waveguide backlighting source illuminated by edge-mounted fluorescent light tubes.
Figure 5:
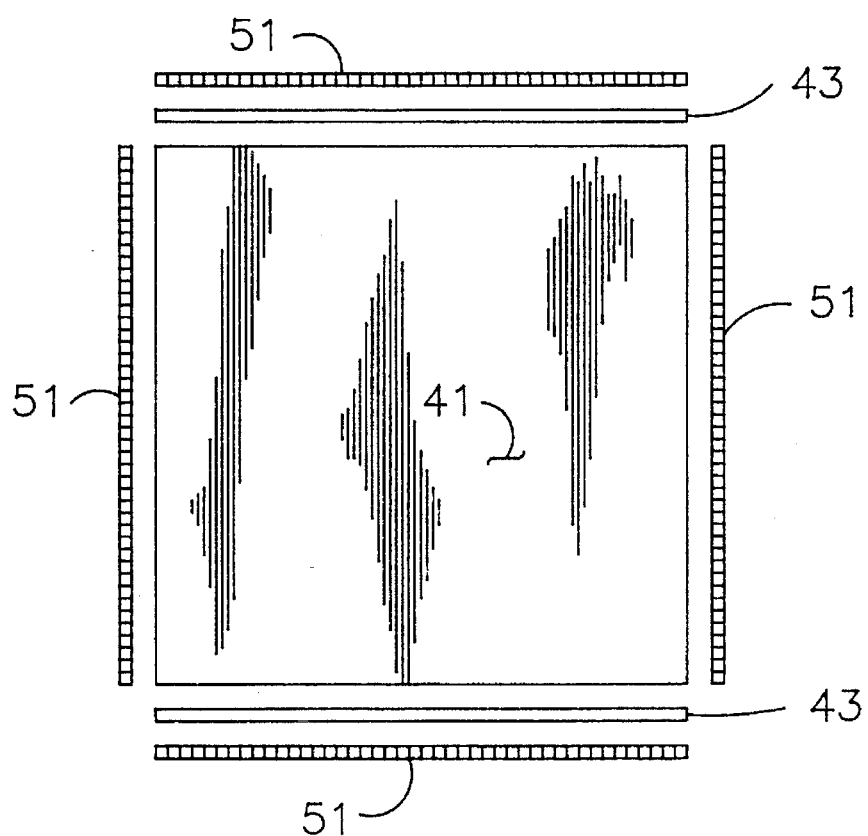
FIG. 5 is a prior art top view illustrating the solid state backlighting system of FIG. 4 augmented with low intensity light sources.
Figure 6:
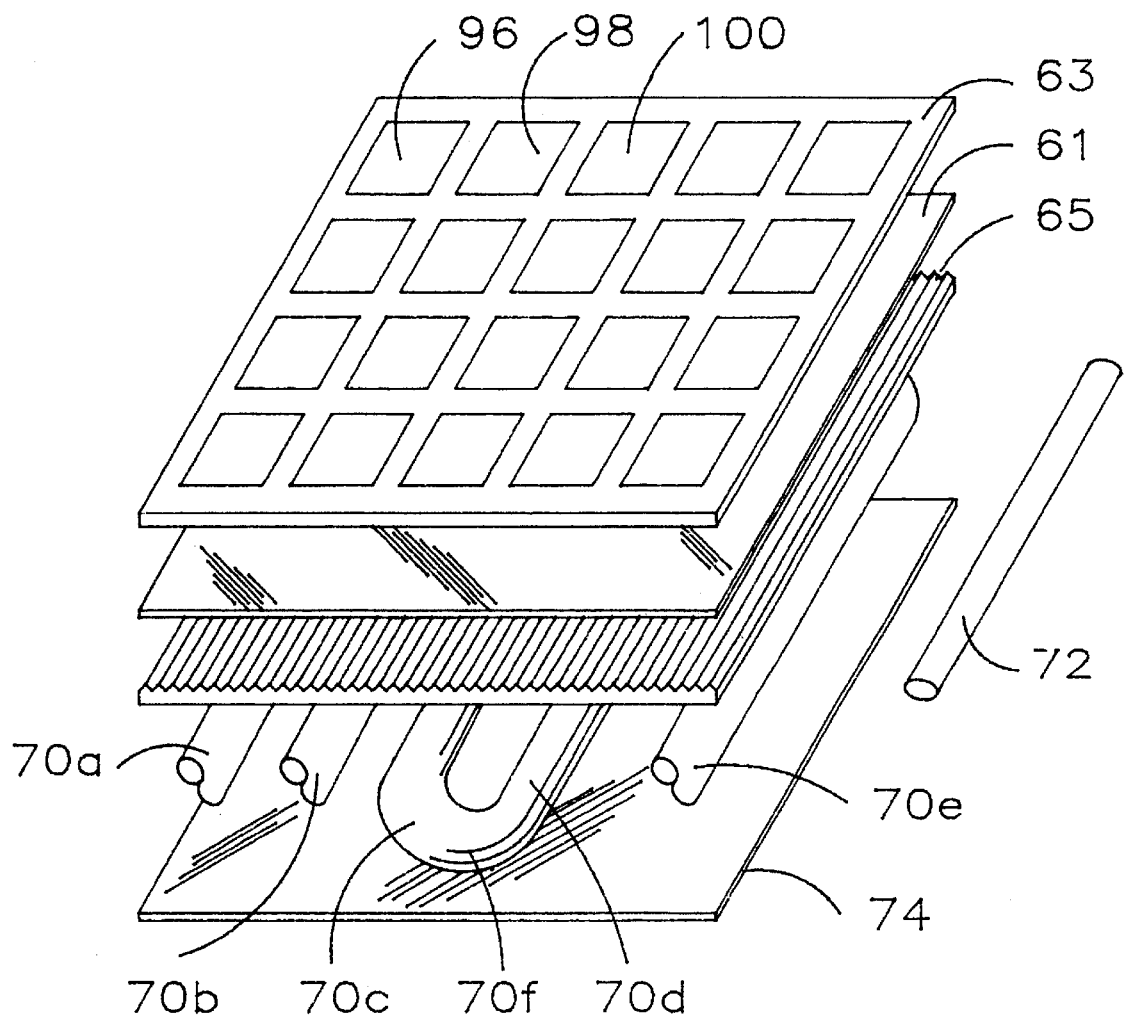
FIG. 6 is a fragmentary perspective view of a first embodiment of this invention illustrating the relative disposition of one preferred embodiment of the integral collimating/reflecting/image splitting lens of this invention relative to the high and low intensity light sources.
Figure 11:
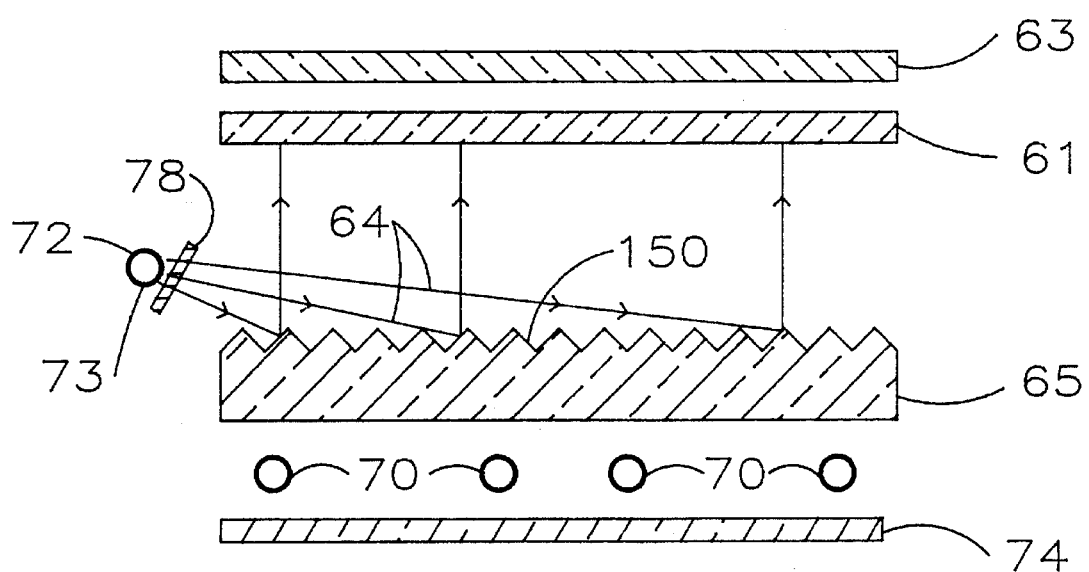
Figure 12:
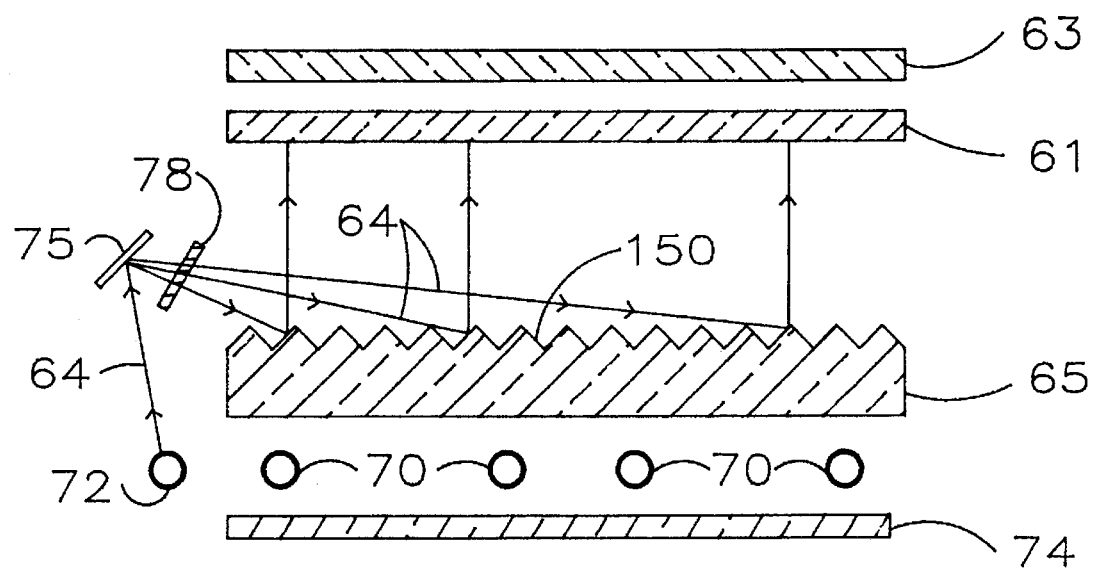

FIG. 11 is a cross-sectional view of FIG. 6 illustrating the manner in which rays of light emanating from the axially aligned edge-mounted low intensity light source of FIG. 6 are reflected by the optical media of the integral lens array of the instant invention; and FIG. 12 is a cross-sectional view of a second embodiment of this invention illustrating the low intensity light being directed toward the integral lens via an edge-mounted mirror.

DETAILED DESCRIPTION OF THE INVENTION

Liquid crystal displays operate as light modulators and do not emit light. Therefore, liquid crystal displays rely upon ambient illumination or backlighting to provide the light necessary for reading. Active matrix liquid crystal displays use a twisted nematic liquid crystal material (not shown) and two polarizers (not shown) as the optical components in the modulating mechanism. The backlighting scheme of this invention may be used in conjunction with a liquid crystal display having either crossed or parallel polarizers.

Disclosed as part of the instant invention is an improved day/night backlighting assembly for an electronic display, such as a liquid crystal display and more specifically, by way of example and not by way of limitation, for an active matrix liquid crystal display for military and avionic applications. Active matrix liquid crystal displays, which operate in full color (red, green, and blue) and in a transmissive mode, represent the primary choice of flat panel technologies for avionic and military applications because of their daylight and nighttime readability, high resolution, color and gray scale capability, low power consumption, and preferable low profile. It is to be specifically noted that while an active matrix liquid crystal display will be described in detail hereinafter as a preferred embodiment, the instant invention can be used with equal advantage in any type of backlit electronic display known to those skilled in the art.

Therefore, the improved day/night backlighting assembly described herein is adapted to enhance daytime and nighttime lighting parameters such as required brightness, redundancy of lamps, and low heat effects, while simultaneously providing a low profile to the overall depth and width dimensions of the display structure. With the foregoing objectives clearly in mind, the improved day/night assembly will be described in greater detail in the following paragraphs.

It is to the end of developing a liquid crystal display, viewable both by the naked eye during the day and by night vision equipment at night, with a reduced or low profile that the instant invention is directed. This is accomplished by incorporating three optical elements, i.e. an image splitting lens, a light reflector, and a collimating lens, into a single, integral collimating/reflecting/image splitting lens 65.

In the embodiment of this invention illustrated in FIGS. 6 and 11, the collimating/reflecting/image splitting lens 65 is operatively disposed so as to provide a low profile liquid crystal display assembly. The low profile or depth dimension of the display is especially important and is dependent on the type of lighting assembly, the material from which the threshold devices are fabricated, the on-board electronics, the multiplexing schemes, and most importantly the optical arrangement by which light is diffused, collimated and transmitted to the viewing audience.

There are seven basic elements which combine to form the electronic display of the embodiment of this invention depicted in FIGS. 6 and 11. The uppermost (outermost) element is the generally rectangularly-shaped glass panel 63 upon which the rows and columns of active matrix liquid crystal picture elements or pixels (see also FIG. 7) as well as the associated drive circuitry, described below, are disposed. The lowermost (innermost) element is the thin, generally rectangularly shaped back reflector panel 74 upon the interior surface of which one or more thin film layers of highly reflective material, such as aluminum or silver, and a light transparent material having a low index of refraction, are deposited. Disposed immediately above the highly reflective panel 74 is an array of high intensity daytime light sources 70 from which high intensity radiation emanates and either passes upward towards the matrix array of picture elements 63 or is reflected off the highly reflective panel 74 and then passes upwardly toward the matrix array 63.

During high ambient light conditions (e.g. daytime), only the high intensity light source(s) 70 is in the "on" state. In darkened conditions (e.g. at nighttime) when night vision equipment is required or dimming is desired for night convenience, the high intensity source(s) 70 is turned off and the low intensity source 72 is turned "on".

The integral collimating/reflecting/image splitting lens 65 of the instant invention is operatively located between the array of high intensity light sources 70 and the matrix array of pixels 63. The low intensity nighttime light source 72 (and preferably a corresponding IR filter 78 illustrated in FIG. 11) is edge-mounted between the integral collimating/reflecting/image splitting lens 65 and the diffuser 61. The outer or upper surface of the integral lens 65 reflects the low intensity light rays 64 emanating from nighttime light source 72 and redirects them toward the matrix array 63 as shown in FIG. 11. Although the IR filter 78 is preferable the backlighting scheme according to certain embodiments of this invention need not include an IR filter.

As illustrated in FIGS. 6 and 11, a single low intensity light source 72 is fixedly edge-mounted adjacent and between the integral lens 65 and diffuser 1. Alternatively, a second low intensity nighttime light source may be fixedly edge-mounted either immediately adjacent the first low intensity light source 2, or on the opposing side of the backlighting assembly.

It is the combination of these elements which define the profile, preferably the low profile, of the day/night liquid crystal display of the instant invention.

In order for electronic displays to gain increased acceptance in military and avionic applications, the backlighting of flat panel displays, and particularly active matrix liquid crystal displays, must be improved in light efficiency and reliability. In order for a full color liquid crystal display to possess acceptable contrast under high and low ambient light conditions, the backlighting arrangements must be bright in the daytime, and dim at nighttime for viewing convenience and so as to not interfere with night vision equipment (e.g. NVG) as discussed above.

While conventional backlighting systems (e.g. the display of aforesaid discussed U.S. Pat. No. 5,143,433) may have the requisite light output, they still require high power (on the order of about 2.4 watts/sq. in. or higher) and a depth dimension of at least about 2". In contrast thereto, due mainly to the image splitting and collimating aspect of the integral lens 65, the backlighting assembly of the instant invention consumes only about 1.2 watts/sq. in. of power during the daytime with a depth dimension of only about 1.0"–1.5" (most preferably about 1.0"). At nighttime when night vision equipment is required, the backlight assembly of this invention consumes a fraction of that amount because of the deactivated state of the high intensity light source 70 and the reduced power consumption of the low intensity light source 72.

In addition, also due to the image splitting and collimating aspects of the integral lens 65, the display design of this invention significantly increases lamp life of both the day and night lamps, a critical parameter in the design and successful marketing of electronic displays, to approximately 8,000 hours or more for the daytime high intensity light source from the typical values of about 4,000 hours exhibited by prior art lighting arrangements. Because the instant invention utilizes both an independent high intensity daytime light source and an independent low intensity nighttime light source, the lifetime of both sources is also necessarily increased because the high intensity light source 70 remains off at night and the low intensity light source 72 remains off during the day.

Herein, the aforesaid described integral lens 65 acts as a reflector for redirecting light rays 64 emitted from nighttime low intensity light source 72 toward the liquid display panel. The image splitting aspect of the integral lens, more fully shown in FIGS. 9–10, effectively doubles the area which the high intensity daytime light source 70 can uniformly and effectively illuminate. The integral lens 65 is further adapted to collimate (See FIGS. 9–10) the high intensity light (directed upward toward the integral lens) emanating from the daytime light source 70 and to reflect the low intensity light 64 (directed downward from source 72 toward the integrated lens) emanating from the nighttime light source 72, for uniform distribution of both high and low intensity light onto the back of the matrix 63 forming the liquid crystal display.

Figure 9:
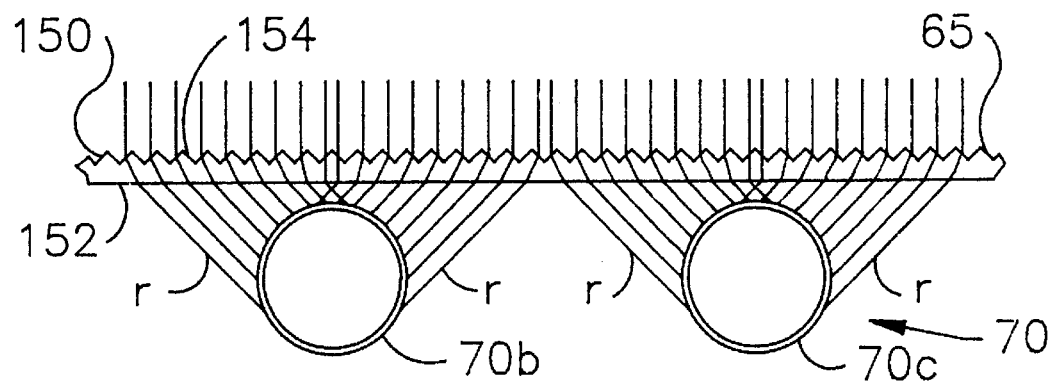
FIG. 9 is a partial, cross-sectional view of FIG. 6 illustrating the manner in which the rays of light emanating from the axially aligned high intensity lighting configuration of FIG. 6 are split and collimated by the optical media of the integral collimating, reflecting, and image splitting lens of the instant invention.
Figure 10:
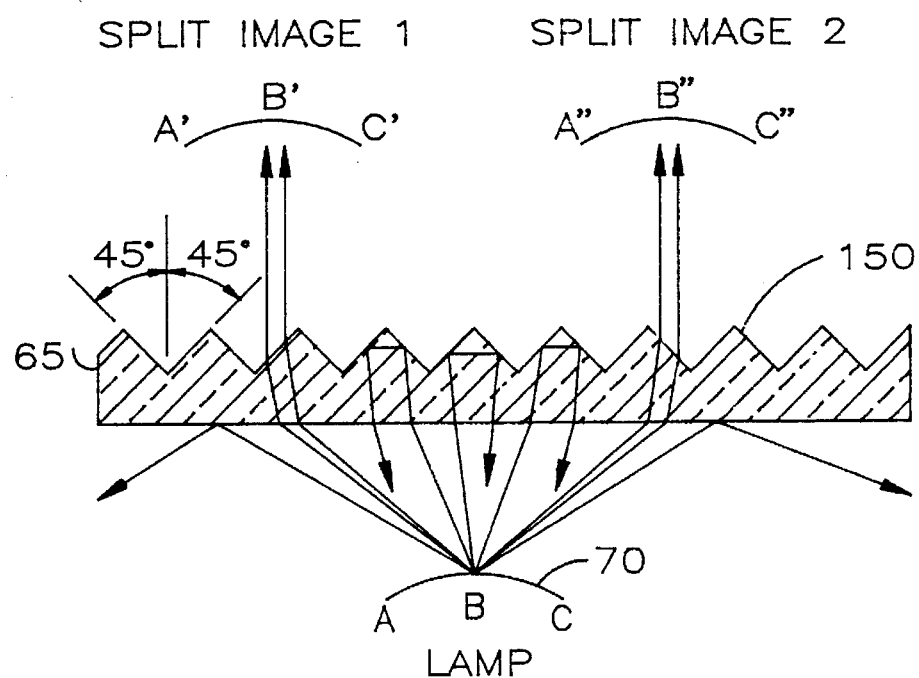
FIG. 10 is a partial cross-sectional schematic view of FIG. 9 illustrating the manner in which the rays of light emanating from the high intensity light source are refracted on each side of the integral image splitting/reflecting/collimating lens to provide two similar images thereof.

Referring now to FIGS. 9–10, there are several ways to obtain light collimation, such as, for example, through the use of various combinations of parabolic shaped reflectors and lens elements. However, the integral lens 65 of the instant invention is adapted to collimate light passing therethrough due to the presence of multi-faceted prisms 150 formed on the upper surface 154 thereof. Specifically engineered facets 150 of close tolerances will not only achieve the desired optical effect of splitting the image of the light source, but will also collimate each image.

A preferred material, ideally suited for use as the integral collimating/reflecting/image splitting lens is the aforesaid discussed Optical Lighting Film (registered trademark of 3M Scotch) which is subsequently laminated onto a transparent substrate (not shown) such as glass, ceramic, or a synthetic plastic resin.

By employing an integrally formed collimating/reflecting/image splitting lens 65 it is thus possible to achieve three desired optical effects with a decrease in the profile of the liquid crystal display as compared to other non-integrally formed optical systems. Indeed, as disclosed in aforesaid mentioned U.S. Pat. No. 5,161,041, because the distance between the similar images (split image 1 and split image 2) provided by the image splitting or refracting aspect of the lens 65 is controlled by the operative spacing of the lens from the high intensity light source (i.e. the more distant the lens from the light source, the further apart the two images appear) and since it is desired that the distance between the two images be controlled so that the two images are immediately adjacent one another as shown in FIG. 9, thus creating uniform illumination, it is possible, and indeed desirable to dispose the collimating/reflecting/image splitting lens 65 in close proximity but with the appropriate spacing from the high intensity light source 70 to accomplish this purpose.

Returning now to FIGS. 6 and 11, a diffuser 61 is provided to provide acceptable off axis or wide angle viewing. However, due to the high degree of uniformity of light provided by the collimating/reflecting/image splitting lens 65 it is not necessary to diffuse the light to the extent necessary in prior art backlight assemblies, and thus the profile of the backlight assembly is further reduced.

The backlight assembly of FIGS. 6 and 11 further includes conventional light source control electronics (not shown) having provisions from turning on and off both the high intensity daytime light source 70 and the low intensity nighttime light source 72. At nighttime or in darkened conditions when NVG capability is required, the high intensity light source 70 is turned off while the low intensity light source 72 is turned on.

In certain embodiments of this invention, both the high intensity daytime lamp and the low intensity nighttime lamp are provided with their own dimming circuitry which allows both lamps to be dimmed in their respective intensity ranges.

In the preferred embodiments of this invention illustrated in FIGS. 6–12, the array of light sources 70 is configured as one elongated, serpentine, fluorescent lamp (although it must be appreciated that a plurality of discrete elongated tubular lamps could be employed without departing from the spirit or scope of the instant invention) arranged in a specific pattern or lighting configuration and having each section of lamp disposed in a general horizontal plane. More specifically, the array, regardless of configuration, will be arranged to uniformly distribute radiation emanating therefrom over the entire surface area of the matrix 63 of rows and columns of pixels 96-112. To this end, the lighting array is shaped in a serpentine pattern which may include a plurality of elongated lamp sections, such as 70a–70e, each lamp sections of which has a longitudinal axis parallel to the longitudinal axis of the other major lamp sections. The length of each longitudinal lamp axis is generally coextensive with the length dimension of the matrix array 63 of picture elements 96–112. The configuration of the lighting array 70 also includes curved end sections such as 70f. The number of the elongated axial sections of the lamps and the number of the curved end sections of the lamps must be sufficient to bathe the entire width dimension of the matrix array of pixels with a uniform shower of illumination.

Likewise, the length of the elongated night lamp 72 is generally coextensive with the length or width dimension of the matrix array of picture elements, and the number of elongated low intensity night lamps 72 must be sufficient to bathe the entire length or width dimension of the matrix array of pixels with a uniform shower of low intensity IR filtered illumination.

Alternatively, the array of high intensity light sources may be configured as a square, helical fluorescent lamp (although it must be appreciated that a plurality of discrete elongated tubular lamps could be employed without departing from the spirit or scope of the instant invention) arranged in a specific pattern or lighting configuration and having each section of lamp disposed in a generally horizontal plane.

Figure 7:
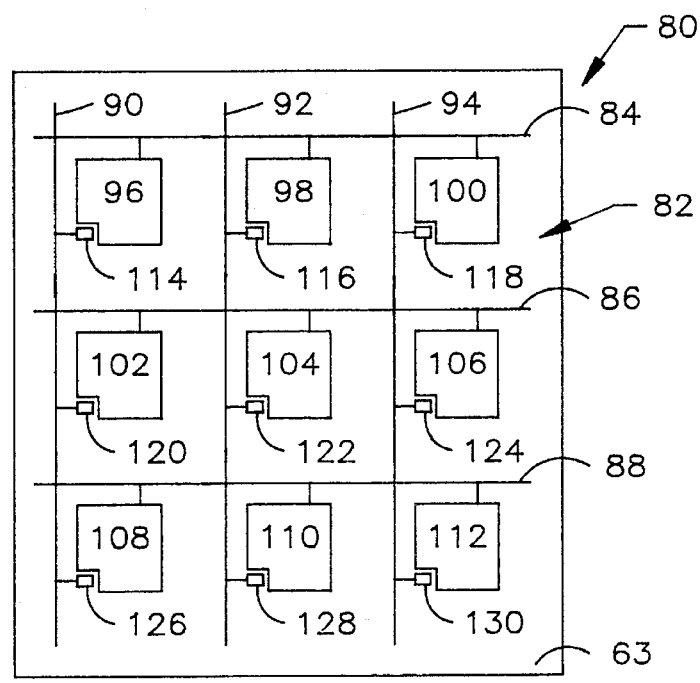
FIG. 7 is a stylistic front elevational view of the matrix array of rows and columns of liquid crystal picture elements or pixels of the active matrix liquid crystal display of the instant invention schematically illustrating the manner in which the threshold switching elements are operatively disposed between the address lines and one of the picture element electrodes.
Figure 8:
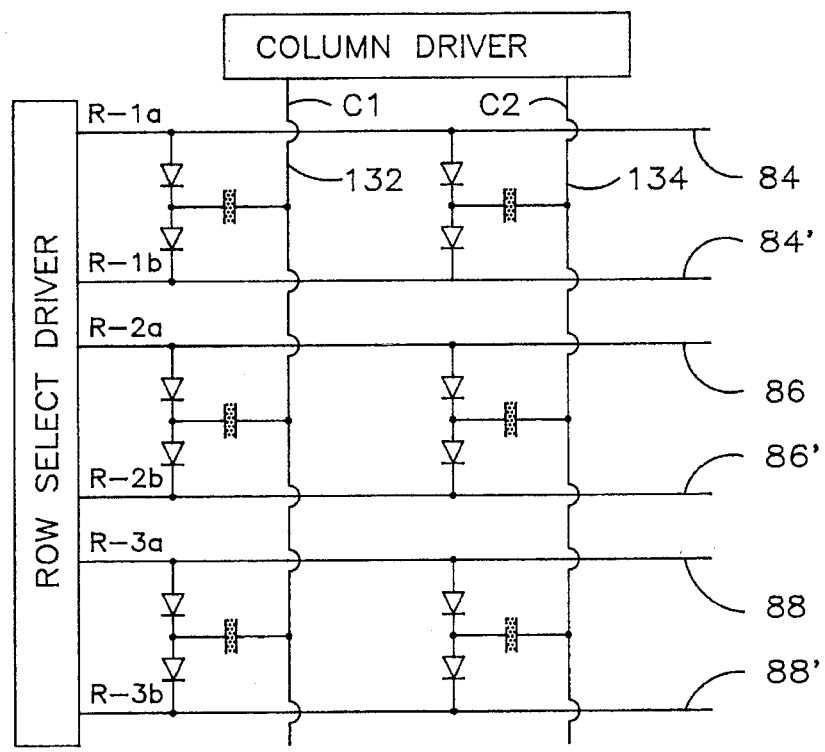
FIG. 8 is an equivalent circuit diagram of the active matrix embodiment of the array of FIGS. 6–7, illustrating the relationship between the liquid crystal picture elements or pixels and the anode-to-cathode connected diodes by which individual ones of the pixels depicted in FIGS. 6–7 are addressed.

Turning now to FIGS. 7 and 8 there is depicted therein a matrix array of rows and columns of discrete liquid crystal display picture elements or pixels 96112, the matrix array being generally designed by the reference numeral 80. Each liquid crystal display picture element, or pixel, includes two spacedly disposed pixel electrode plates (not shown) with a light influencing material, such as a liquid crystal composition (not shown), operatively captured therebetween. Each of the pixels 96–112 further includes a threshold switching device (e.g. TFT or diode) or a plurality of threshold switching devices for selectively applying an electric field across the liquid crystal composition when the electric field exceeds a predetermined threshold value.

More specifically, the matrix array 80 which defines the liquid crystal display of the instant invention includes a first set of X address lines 84, 86, and 88; a second set of Y address lines 90, 92, and 94; and a plurality of liquid crystal pixture elements 96, 98, 100, 102, 104, 106, 108, 110, and 112. The display further includes at least one isolation or addressing element 114, 116, 118, 120, 122, 124, 126, 128, and 130 operatively associated with and electrically connected to each respective one of the picture elements. As should be readily apparent to the reader, the X address lines 84, 86, and 88 and the Y address lines 90, 92, and 94 cross over one another at an angle so as to define a plurality of spaced crossover points associated with respective ones of the liquid crystal picture elements. The picture elements are formed on the transparent substrate 63, such as glass, and are distributed thereover in spacedly disposed relations so as to define interstitual spaces therebetween.

As can be readily ascertained from FIGS. 7 and 8, each of the threshold devices 114–130 is preferably coupled in non-opposing series relation with a first one of the pixel electrodes. This type of switching arrangement will now be described with respect to FIG. 8.

In FIG. 8, the matrix array includes a plurality of substantially parallel address line pairs 84, 84', 86 86', 88 and 88' which are the row select lines, and a plurality of substantially parallel column address lines 132 and 134. The column address lines 132 and 134 cross the row select address line pairs at an angle and are spaced from the row select address line pairs to form a plurality of crossover points therewith. Preferably, the column address lines cross the row select line pairs at an angle which is substantially perpendicular thereto. For a more detailed description of the threshold switching devices and LCD matrix driving circuitry described above and in FIGS. 7 and 8, one may reference U.S. Pat. Nos. 5,128,783, 4,731,610, or 5,161,041, the disclosures of which are hereby incorporated herein by reference.

FIG. 9 is a cross-sectional view of the lens of the embodiments illustrated in FIGS. 6, 11, and 12, the cross-sectional view provided to demonstrate the manner in which rays of light "r" emanating from the high intensity daytime lamps 70B and 70C of the lighting configuration 70 are collimated to present a sharp, substantially uniform image to the viewing audience of the liquid crystal display of the instant invention. As can be seen in FIG. 9, the rays of light "r" emanating from the parallel lamp sections 70 are directed upwardly through the relatively thin collimating/reflecting/image splitting lens 65. The upper surface 154, the surface opposite the high intensity light source 70, of the integral lens 65 is engineered so as to comprise a series of aligned multi-faceted prisms 150. The prisms 150 are aligned such that the longitudinal extent thereof are substantially parallel to the longitudinal extent of the substantially parallel high intensity lamp sections 70B and 70C. At both the planar air-to-material interface 152 and the faceted material-to-air interface 154, the rays of high intensity light are collimated and transmitted to the viewers in that collimated fashion. Note that for purposes of illustrating the collimating effect of the lens ray of this invention, neither the reflector plate nor the matrix array are depicted in FIGS. 9–10. Of course, it is also the aligned facets of the prisms 150 that provide the image splitting effect, discussed below, which is critical to the performance provided by the instant invention.

FIG. 10 schematically illustrates how the above referenced aligned facets of the prisms 150 inherently operate to provide an image splitting effect. This, of course, also illustrates the inherent characteristics of operation of the aforesaid 3M Optical Lighting Film when used in this invention. As illustrated with reference to a segmented arc of lamp 70 having a mid-point B and extremities A and C (these points be designated for convenience of illustration, it being understood that lamp 70 is a circular tube), searching rays of light are reflected backwardly while others are allowed to exit in collimated fashion from integral lens 65 due to the properties of the Optical Lighting Film more fully described in aforesaid mentioned "3M SCOTCH™ Optical Lighting Film General Theory", (November, 1988). To the observer located at EYE this inherently results in split images 1 and 2, the locations of which are governed by the distance between the lamp 70 and the integral lens 65. By adjusting the distance properly so as to bring the two images edge-to-edge, substantially uniform illumination is achieved.

FIG. 11 is a cross-sectional view of the embodiment shown in FIG. 6, which illustrates the elongated tubular low intensity nighttime light source 72 and its corresponding coextensive elongated small infrared filter 78 edge-mounted adjacent and between the integral collimating/reflecting/image splitting lens 65 and the diffuser 61. The low intensity light rays 64 emitted from the low intensity night lamp 72 are reflected by the faceted prisms 150 of the integral lens 65, thereby being redirected upward toward the diffuser 61 and matrix array 63. The interior or exterior surface of the low intensity lamp 72 may be coated with a known reflective material 73 which only allows the lamp 72 to emit light in the direction of the facted prisms 150 of the integral lens 65. Lamps with such coatings thereon are known commercially as "aperture lamps." An interference IR filter could also be used in conjunction with such a coated lamp.

The low intensity lamp 72 preferably has the same spectral characteristics as the daytime lamp 70 with three (red, green, and blue) peaks. Accordingly, all three colors will be saturated both during the day and at night. The three peaks are sharper than those provided by conventional EL light sources. The positioning of the low intensity light source 72 illustrated in FIG. 11 allows the thin or low profile (depth dimension of only about 1") of the liquid crystal display of U.S. Pat. No. 5,161,041 to be maintained while still providing NVG compatibility and for a refracting and collimating of the daytime high intensity light.

The filter 78 illustrated in FIG. 11 is more fully described in commonly owned co-pending U.S. patent application Ser. No. 07/925,193, now U.S. Pat. No. 5,262,880, hereby incorporated herein by reference. Infrared filter 78 absorbs substantially all infrared light (i.e. virtually none is transmitted to display panel 63), but color integrity is maintained and by use thereafter of a diffuser 61, the viewing angle problem inherent in sharp cutoff infrared filters (discussed in detail and aforesaid mentioned Ser. No. 07/925,193) is overcome at all reasonable viewing angles (e.g. 0°–30° from normal and most preferably angles 0°–60° from normal to the surface of panel 63). Of course, as will be appreciated by those skilled in the art, any type of infrared filter could be used in conjunction with this invention.

FIG. 12 illustrates a second embodiment of this invention. The difference between this embodiment and that of FIGS. 6 and 11 lies in the positioning of night lamp 72 and the use of a reflecting mirror 75. The reflecting mirror 75 is fixedly edge-mounted adjacent and between the integral lens 65 and the optional diffuser 61. The presence of the mirror 75 allows the low intensity light source 72 to be mounted in a position remote from the lens 65 and the diffuser 61. The filter 78 may be mounted as shown in FIG. 12, or alternatively, immediately adjacent the remotely positioned low intensity source 72. This embodiment utilizes less space adjacent the integral lens 65 than the embodiment of FIG. 11. A light guide (not shown) may be used to properly direct or guide the low intensity light rays from source 72 toward the mirror 75. Alternatively, a surface of the low intensity source 72 may be coated with a reflective material so as to allow the lamp 72 to only emit light rays in the direction of mirror 75. Of course, a light guide (not shown) and reflective lamp coating may be used in combination with one another. Regarding the embodiment of FIG. 12, the source 72 may be positioned anywhere from which it can direct low intensity IR filtered light rays downward onto the upper surface of integral lens 65.

As can be seen from the above, the unique day/night mode liquid crystal display of this invention maintains a low profile, low power consumption, NVG compatibility, high brightness illumination during the day, and utilizes a minimal number of low intensity nighttime light source(s) and corresponding IR filter(s).

Once given the above disclosure, therefore, various other modifications, features or improvements will become apparent to the skilled artisan. Such other features, modifications and improvements are thus considered a part of this invention, the scope of which is to be determined by the following claims.

I claim:

1. A backlighting system for a liquid crystal display, comprising:
   a first light source for emitting high intensity light;
   a second light source for emitting low intensity light;
   an integral collimating, reflecting, and image splitting means for:
   i) collimating light from said first light source;
   ii) refracting light from said first light source to provide two similar images thereof; and
   iii) reflecting light rays from said second light source and redirecting said rays from said second light source toward said liquid crystal display; and
   wherein said first light source is located on a first side of said integral collimating, reflecting, and image splitting means which is opposite a viewer, and said second light source directs its light rays toward said integral collimating, reflecting, and image splitting means from a second side of said integral means opposite said first side.

2. The backlighting system of claim 1, wherein said integral means includes a thin film layer having a plurality of faceted prisms formed thereon defining an outer surface thereof, and wherein said faceted prisms reflect the light rays of said second light source, and collimate and refract light rays of said first light source, whereby the light rays of both the first and second light sources are directed toward a matrix array of liquid crystal display pixels.

3. In a backlit liquid crystal display which includes: a first light source for emitting high intensity light activated for daylight viewing of the display; a second light source for emitting low intensity light for viewing in darkened conditions when said first light source is deactivated; and means for diffusing said high and low intensity light wherein said diffusing means is operatively disposed between a matrix array of liquid crystal picture elements and said first and second light sources; said liquid crystal display being capable of providing an image to a remotely positioned observer, the improvement comprising:
   an integral collimating, reflecting, and image splitting means, fixedly mounted between said diffusing means and said first light source, for:
   i) collimating light from said first light source;
   ii) refracting light rays emanating from said first light source to provide two similar images thereof; and
   iii) reflecting light rays emanating from said second light source and redirecting said rays upward and through said diffusing means and into said matrix array of liquid crystal picture elements;
   thereby enlarging the area effectively illuminated by said first and second light sources, whereby a uniform light distribution is provided in a low profile assembly.

4. The display of claim 3 wherein said second light source for emitting low intensity light includes an elongated tubular lamp which is edge-mounted between said diffusing means and said integral collimating, reflecting, and image splitting means.

5. The display of claim 4 wherein an elongated infrared light-absorbing filter capable of preventing substantially all infrared light from being emitted from said second light source while, at the same time, transmitting substantially all red light and all other light in the visible spectrum therethrough thereby to maintain the color integrity of the display, is fixedly mounted between said second light source and said integral collimating, reflecting, and image splitting means.

6. The display of claim 5 wherein said infrared filter maintains the color integrity of the image of the display throughout a viewing angle of from about 0°–30° from normal.

7. The display of claim 6 wherein said infrared filter maintains the color integrity of the image of the display throughout a viewing angle of from about 0°–60° from normal.

8. The display of claim 5 wherein the display includes, in order from back to front: a reflector plate; said first light source; said integral collimating, reflecting, and image splitting means; said edge-mounted second light source; corresponding infrared filter; said diffusing means; and said matrix array.

9. The display according to claim 8 having an RGB-triad color pattern.

10. The display of claim 5 wherein said integral collimating, reflecting, and image splitting means includes a thin film layer having faceted prisms formed on an upper face thereof, wherein light rays from said first light source are refracted by said faceted prisms to provide two similar images thereof, and light rays from said second light source are reflected by said faceted prisms toward said matrix array.

11. The display of claim 3 wherein the high intensity light of the first light source is directed upward from said first light source through inner and outer surfaces of said integral collimating, reflecting, and image splitting means and thereafter through said diffusing means; and
   wherein the low intensity light of said second light source is directed toward and reflected by said outer surface of said integral collimating, reflecting, and image splitting means toward and thereafter through said diffusing means.

12. The display of claim 11, wherein said integral collimating, reflecting, and image splitting means includes a thin film layer having faceted prisms formed thereon defining said outer surface, and wherein said faceted prisms reflect light rays of said second light source, and collimate and refract light rays of said first light source, whereby the light rays of both the first and second light sources are directed toward said matrix array.

\* \* \* \* \*